United States Patent Office 3,829,484
Patented Aug. 13, 1974

3,829,484
PRODUCTION OF SULPHONATED MATERIAL
Austen Edgar Sowerby and Brian John Akred, Cumberland, England, assignors to Albright & Wilson Limited, Oldbury, near Birmingham, Warwickshire, England
No Drawing. Filed May 14, 1971, Ser. No. 143,606
Claims priority, application Great Britain, May 15, 1970, 23,719/70
Int. Cl. C07c 143/84
U.S. Cl. 260—545 R                    21 Claims

ABSTRACT OF THE DISCLOSURE

Sulphonic anhydrides, useful as sulphonating agents in reactions where a stronger agent than sulphonyl chloride is required are prepared by the reaction of from 1.4 to 1.9 moles of $SO_3$ per mole of aromatic compound. In order to improve the yield compounds forming complexes with $SO_3$ are added to the reaction mixture. These compounds are normally those known as sulphone inhibitors or those claimed for such a purpose in U.S. Application Numbers 28,494 and 28,500.

---

The present invention relates to the production of arene sulphonic anhydrides. Such compounds find use as sulphonating agents, in particular they find use in reactions for which a stronger sulphonating agent than a sulphonyl chloride is required.

Hitherto arene sulphonic anhydrides have been produced by treating sulphonic acids with dehydrating agents, thionyl chloride being the most commonly suggested, or by carrying out sulphonation reactions on aromatic compounds employing an excess of sulphur trioxide. The former route suffers from the disadvantage that unless the reactants are substantially pure, in particular having a very low sulphuric acid content, little or none of the desired product may be obtained. The second route which involves the use of an excess of sulphur trioxide and it has been suggested is best carried out in a solvent such as liquid sulphur dioxide, normally results in only a low or moderate yield of sulphonic anhydride.

We have now found that improved yields of sulphonic anhydrides can be obtained by the reaction of sulphur trioxide with aromatic compounds or sulphonic acids or their salts derived from the aromatic compounds if a controlled excess of $SO_3$ over that required for the production of monosulphonates is employed and the reaction is carried out in the presence of a compound capable of forming a complex with sulphur trioxide.

Accordingly the present invention provides a process for the production of arene sulphonic anhydrides which comprises reacting sulphur trioxide with an aromatic compound or a mono sulphonate or salt derived from an aromatic compound in the presence of a compound capable of forming a complex with sulphur trioxide, sufficient sulphur trioxide being employed so that the total molar ratio of $SO_3$ (whether present as free $SO_3$ or as part of a mono sulphate reactant) to aromatic compound is from 1.4 to 1.9:1.

The compound forming a complex with sulphour trioxide should be one which does not react substantially with the aromatic compound being sulphonated, or in the case where a mono sulphonate is employed as a reactant does not react with the aromatic nucleus of the compound. That is to say its rate of reaction with the aromatic compound or the nucleus is sufficiently low as compared to the rate of reaction of $SO_3$ that its products comprise at most 10% of the final reaction product. Suitable compounds are those which may be used as sulphone inhibitors in conventional sulphonation reactions to produce sulphonic acids. Compounds which may be used include those conventionally used as sulphone inhibitors such as short alkyl chain carboxylic acids for example acetic, propionic and peracetic acids, and their anhydrids, such as acetic anhydride. There may also be employed those amino and oxy compounds whose use as sulphone inhibitors is described in our co-pending applications Nos. 28,494 and 28,500 both filed Apr. 14, 1970. These compounds are primary, secondary and tertiary alkyl amines (including cycloalkyl amines) and amides having from 1 to 18 carbon atoms in each alkyl group, and the salts of such amines, alkylamides, alkylolamines, ethylenediamine tertraacetic acid and its salts, nitrilotriacetic acid and its salts, inorganic and organic ammonium salts, aromatic amines and heterocyclic compounds containing a nitrogen atom in one of the aromatic rings and ketones, ethers, including cyclic ethers, and esters of short chain aliphatic carboxylic acids and of oxy acids of phosphorus. Primary and secondary amines are not normally thought of as forming complexes with sulphour trioxide but as described in our co-pending application No. 143,602 filed of even date they can form them. Suitable amino compounds for use in the present invention are primary amines, including cycloalkyl amines, such as ethylamine, monopropylamine, mono-isopropylamine, sec- and tert-butylamine, n-butylamine, hexylamine and cyclohexylamine; secondary amines such as diethylamine, methyl ethylamine, di isopropylamine and di n-propylamine; tertiary amines such as triethylamine, diethylene triamine and salts of such amines in particular those with phosphoric acid or toluene sulphonic acids; alkylolamines such as mono-ethanolamine; alkylolamides such as lauric mono-ethanolamide and amides such as formamide urea and dimethyl formamide; ammonium compounds such as ammonium sulphate, diammonium phosphate and ammonium toluene sulphate, aromatic amines such as aniline and substituted anilines including N-substituted anilines and heterocyclic compounds, such as quinoline, isoquinoline, and pyridine. Suitable oxy compounds include ketones having up to 6 carbon atoms such as acetone diethyl ketone and methyl ethyl ketone; ethers having up to 6 carbon atoms in each alkyl group such as diethyl ether diisopropyl ether and butyl ethyl ether and cyclic ethers such as dioxane; and esters of short chain acids such as acetic and propionic acids having up to 6 carbon atoms in each esterifying group, such as ethyl and propyl acetates, triethyl and tributyl phosphates and triethyl phosphite. We have found that formamide is particularly suitable for use in the present process.

Sulphur trioxide is used in amounts so the that total amount of sulphur trioxide per mole of aromatic nucleus present in the reaction mixture is from 1.4 to 1.9 moles, preferably about 1.5 to 1.7 moles optionally about 1.6 moles. Thus if pure aromatic compound is used as a reactant from 1.4 to 1.9 moles of free sulphur trioxide will be employed whereas if pure mono sulphonate of the aromatic compound is employed only from 0.4 to 0.9 moles of sulphur trioxide per mole of reactant will be added. If a mixture of pure aromatic compound and sulphonate are employed then the appropriate adjustment to the amount of $SO_3$ employed can be made. Compounds which may be converted to their sulphonic anhydrides by the process of our invention include benzene, toluene, xylene, cumene, ethylbenzene and halogenated benzenes and their respective mono sulphonate derivatives.

The process of the invention can be carried out batchwise or continuously in any suitable vessel having adequate means of agitation and cooling. It is normally desirable to carry out the reaction in a liquid sulphur doxide solvent although other suitable solvents for sulphonation reactions may be employed if desired. Normally when liquid sulphur dioxide is employed and when an aromatic compound used as reactants both the aromatic compound and the sulphur trioxide may be dissolved in it before bringing them together to carry out the reaction. Alternatively only one of the reactants, either the aromatic compound or sulphur trioxide may be dissolved in sulphur dioxide before carrying out the reaction. The compound capable of complexing $SO_3$ may be added directly to the reactor as a separate feed. When the process is operating in a batchwise manner either of the reactants may be charged to the reactor and the other reactant may then be added with adequate agitation and cooling. Generally however we prefer, for ease of operation, to dissolve both reactants in liquid sulphur dioxide and, when carrying out the reaction in a batchwise manner, to add the solution of sulphur trioxide in liquid sulphur dioxide to the solution of the aromatic compound in the same solvent. If a continuous process is employed both reactants may be introduced simultaneously. The concentration of sulphur trioxide in liquid sulphur dioxide is in the range 10%–50%, preferably 30%–40% and most preferably 35% by weight. The concentration of aromatic compound in liquid sulphur dioxide is in the range 30%–90%, preferably 60%–90% and most preferably 70%–80% by weight.

The reaction temperature is desirably in the range —40° to 20° C., preferably —20° to 0° C. and most preferably —10° C. The yield of anhydride increases with decreasing reaction temperature. Slightly higher yields of anhydride are obtained when the reaction temperature is —40° C. than when the reaction is carried out at —10° C. However the disadvantage of a slightly lower yield when operation of the process is at —10° C. is outweighed by the advantage of lower refrigeration costs and the ability to use sulphur dioxide as an autorefrigerant. In any event the sulphonic anhydride should be isolated from the reaction mixture immediately after the reaction is completed to ensure maximum yield of anhydride. The anhydrides decompose in the reaction mixture at a rate depending upon the temperature at which the mixture is maintained. For this reason also the reactoin time should be as short as possible.

The proportion of compound forming a complex with $SO_3$ added to the reaction should be in the range 0.5%–4% and preferably 2%–3% by weight based on the anticipated yield of total sulphonate products.

If mono sulphonic acids are employed as reactants then a similar process is employed. The sulphonic acids may be prepared by any of the known methods, for example by sulphonation with sulphur trioxide, oleum or sulphuric acid. Where the latter reagents are employed it is necessary to reduce the free sulphuric acid content of the product sulphonic acid to a low level before employnig it in the process of our invention. This may be achieved by known processes, for example by carrying out the sulphonation step in the presence of an excess of the aromatic compound, continuously distilling out the water of reaction as a bniary mixture with the aromatic compound, separating the water from the binary mixture and recycling the aromatic compound to the reaction. This procedure may be continued until the free sulphuric acid content is reduced to a low level, after which the excess aromatic compound may be distilled from the reaction mixture to recover the anhydrous sulphonic acid.

Tht sulphonic anhydrides may be isolated from the reaction mixture whichever of an aromatic compound or a sulphonate is employed as reactant by quenching it with cold water or a mixture of ice and water. It is preferred to add the reaction mixture to the water as the reverse procedure results in the decomposition of all or a proportion of the sulphonic anhydrides present. The precipitated sulphonic anhydrides may be separated from the quenched reaction mxiture by filtration or centrifuging. Alternatively they may be extracted into an inert and water immiscible solvent, for example chloroform. The solution of sulphonic anhydrides in chloroform is separated from the aqueous solution of sulphonic acids, sulphuric acid and sulphur dioxide and washed with cold water to remove residual traces of these impurities. The chloroform solution may then be dried with a suitable dessicant for example phosphorus pentoxide, and the solvent distilled off to recover the sulphonic anhydride only slightly contaminated with sulphonic acid, sulphuric acid and sulphone. If sulphonic anhydrides are desired in a more pure form this may be achieved by distilling out part of the chloroform solvent and then cooling the concentrated solution to remove crystals of anhydride substantially free from impurities.

Highest yields of anhydride are obtained when the reaction mixture is quenched by pouring it into a mixture of cold water and chloroform or other suitable solvent, separating the aqueous layer from the solvent layer, washing the solvent layer with water and finally drying the solvent layer with a suitable dessicant and recovering therefrom the sulphonic anhydrides by the procedure previously described.

Sulphur dioxide which is evolved during the quenching process is dried by conventional means, for example by passing it through concentrated sulphuric acid and is then condensed and recycled to the process. The aqueous solution of aryl sulphonic acid, sulphuric acid and sulphui dioxide remaining after isolation of the anhydrides is heated to distil out the sulphur dioxide which is dried, condensed and recycled to the process. The sulphonic acids remaining in the aqueous solution may be recovered by conventional means, either as free acids or their salts, for example calcium salts. If desired the sulphonic acids may be separated from sulphuric acid by neutralising the latter with lime and filtering off the insoluble calcium sulphase.

The process of the invention is illustrated by the following Examples:

EXPERIMENTAL PROCEDURE

Reactions were carried in one-litre flasks provided with a stirrer, cold trap, thermometer and a dropping funnel fitted with a cooling jacket. The reaction flask was cooled in a mixture of "cardice" and acetone. Acetone cooled to a temperature of —30° C. by the addition of "cardice" was circulated through the jacket of the dropping funnel by means of a pump. The cold trap was charged with the "cardice"—acetone freezing mixture. The dropping funnel was charged with a solution of sulphur trioxide in liquid sulphur dioxide and the reaction flask was charged with a solution of one gram mole of the aromatic compound in liquid sulphur dioxide. In reactions where sulphone inhibitors were included, these were added to the solution of the aromatic compound in the reaction flask. In all reactions the solution of sulphur trioxide in liquid sulphur dioxide was added to the vigorously agitated solution of the aromatic compound during a period of 15 minutes, while controlling the reaction temperature at —10° C. The resultant mixture was then poured into a mixture of 250 g. water and 1500 g. chloroform and allowed to separate into two layers. The chloroform layer was washed twice with cold water, dried over phosphorus pentoxide, filtered, and evaporated to dryness to recover a mixture of sulphonic anhydrides and sulphones.

COMPARATIVE EXPERIMENTS

Using the experimental procedure described above the effect of varying the proportion of sulphur trioxide was investigated. Reactions were carried out in the absence of sulphone inhibitor and yields of toluene sulphonic anhydride and ditolyl sulphone were determined. The concentration of sulphur trioxide in liquid sulphur dioxide was 35% and the concentration of toluene in liquid sulphur dioxide was 75%. The results obtained are given in the following table:

| Moles SO₃/ mole toluene | Anhydride yield, percent | Sulphone content of anhydride, percent |
|---|---|---|
| 1.0 | 3.8 | 63.5 |
| 1.1 | 12.7 | 31.9 |
| 1.2 | 32.3 | 19.0 |
| 1.3 | 44.5 | 15.2 |
| 1.4 | 48.7 | 14.8 |
| 1.5 | 57.9 | 8.9 |
| 1.6 | 62.0 | 8.8 |
| 1.7 | 51.1 | |

The maximum yield of anhydride was obtained when 1.6 moles of sulphur trioxide were reacted with 1.0 mole of toluene. In these compartive experiments and in all the following examples the yield is expressed as the percentage of the aromatic compound converted to sulphonic anhydride.

Example 1

Reactions were carried out in the presence of known sulphone inhibitors, using the general experimental procedure described above and the following standard conditions: Concentration of sulphur trioxide in sulphur dioxide, 35 wt. percent; concentration of toluene in sulphur dioxide, 75 wt. percent. Mole ratio $SO_3$: toluene, 1.6:1.0. Concentration of sulphone inhibitor, 3.0%*.
The results are given in the following table:

| Sulphone Inhibitor: | Anhydride Yield, percent |
|---|---|
| Formamide | 74.5 |
| Isopropylamine | 70.0 |
| Acetic acid | 69.8 |
| Urea | 68.4 |
| Pyridine | 68.3 |
| Dimethylamine | 66.6 |
| Dimethylformamide | 66.1 |

All the sulphone inhibitors used have increased the yield of sulphonic anhydride compared with that obtained under identical conditions in the absence of inhibitors. The highest yield was obtained using formamide as inhibitor.

*Calculated on theoretical yield of product assuming 100% conversion of toluene to monosulphonic acid.

Example 2

Reactions were carried out using the experimental procedure described above and in the presence of 2 wt. percent of formamide calculated on the theoretical yield of toluene monosulphonic acid. The proportions of sulphur trioxide used and the yields of anhydride obtained are shown in the following table. The concentration of sulphur trioxide in sulphur dioxide was 35 wt. percent, and of toluene in sulphur dioxide, 50 wt. percent.

| Moles SO₃/mole toluene: | Anhydride Yield, percent |
|---|---|
| 1.1 | 17.9 |
| 1.2 | 21.1 |
| 1.3 | 34.7 |
| 1.4 | 49.7 |
| 1.5 | 59.0 |
| 1.6 | 73.0 |
| 1.7 | 67.1 |

Maximum yield of anhydride was obtained using 1.6 moles of sulphur trioxide per mole of toluene.

Example 3

Reactions were carried out using the experimental procedure described above and in the presence of 2 wt. percent of formamide calculated on the theoretical yield of toluene monosulphonic acid. The proportion of sulphur trioxide used in each experiment was 1.5 moles per mole of toluene and the concentration of sulphurtrioxide in liquid sulphur dioxide was 35 wt. percent. The concentration of toluene in liquid sulphur dioxide and the relative yields of sulphonic anhydrides are shown in the following table:

| Concentration of Toluene in Sulphur Dioxide | Anhydride Yield, percent |
|---|---|
| 33 wt. percent | 53.1 |
| 50 wt. percent | 59.0 |
| 60 wt. percent | 61.8 |
| 75 wt. percent | 70.3 |
| 86 wt. percent | 63.0 |
| 100 wt. percent | 63.2 |

The maximum yield of sulphonic anhydride was obtained using a 75 wt. percent solution of toluene in liquid sulphur dioxide.

Example 4

Reactions were carried out using the experimental procedure described above, reacting 1.5 g. moles of sulphur trioxide, in the form of a 35 wt. percent solution in liquid sulphur dioxide, with 1 g. mole of toluene in the form of a 50 wt. percent solution in liquid sulphur dioxide. The reactions were carried out in the presence of varying proportions of formamide, these proportions being calculated on the theoretical yield of monosulphonic acid. The results obtained are shown in the following table.

| Formamide Proportion Wt. percent: | Anhydride Yield percent |
|---|---|
| 2.0 | 59.0 |
| 2.5 | 63.6 |
| 3.0 | 64.8 |
| 3.5 | 60.3 |
| 4.0 | 53.7 |

The maximum yield of anhydride was obtained using 3.0% of formamide as inhibitor.

Example 5

Reactions were carried out using the experimental procedure described above and employing the optimum concentration of toluene in liquid sulphur dioxide and the optimum proportion of formamide established in the preceding examples. Concentration of sulphur trioxide in sulphur dioxide, 35 wt. percent; Concentration of toluene in sulphur dioxide, 75 wt. percent; Proportion of formamide. 3% on theoretical yield calculated as toluene monosulphonic acid.

The molar proportions of sulphur trioxide, yields of sulphonic anhydride and the sulphone contents of the products are given in the following table.

| Moles SO₃/ mole toluene | Anhydride yield, percent | Sulphone content of anhydride, percent |
|---|---|---|
| 1.5 | 70.9 | 2.2 |
| 1.6 | 74.5 | 1.5 |
| 1.7 | 67.0 | 1.5 |

Example 6

The sulphonic anhydrides of benzene, xylene, cumene and ethylbenzene were prepared employing the experimental procedure previously described. The conditions employed and the yields of sulphonic anhydrides were as given in the following table.

CONCENTRATION OF REACTANTS

| Aromatic compound | Percent SO₃ in SO₂ | Percent Aromatic compound in SO₂ | Formamide* | Moles SO₃ per mole aromatic compound | Yield of sulphonic anhydride |
|---|---|---|---|---|---|
| Benzene | 35 | 50 | 3 | 1.6 | 57.0 |
| Xylene | 35 | 75 | 3 | 1.6 | 55.3 |
| Cumene | 35 | 75 | 3 | 1.6 | 60.2 |
| Ethylbenzene | 35 | 75 | 3 | 1.6 | 55.8 |

*Based on the theoretical yield calculated as monosulphonic acid.

Example 7

Toluene sulphonic anhydride was prepared in duplicate experiments run under identical conditions with the exception that, in one case (A) no sulphone inhibitor was employed and, in the other case, (B) 3 wt. percent of formamide based on the theoretical yield calculated as monosulphonic acid was added to the solution of toluene in liquid $SO_2$. The experimental procedure was as previously described and the conditions were as follows: Concentration of sulphur trioxide in liquid sulphur dioxide, 35 wt. percent; Concentration of toluene in liquid sulphur dioxide, 75 wt. percent; Mole ratio sulphur trioxide toluene, 1.6:1.0.

In both cases the reaction mixture was quenched into a mixture of chloroform and water. The chloroform layer, containing sulphonic anhydrides and sulphones, was washed twice with cold water, dried over phosphorus pentoxide and evaporated to dryness to recover products having the compositions given in the following table.

|  | A | B |
|---|---|---|
|  | No sulphone inhibitor, percent | 3% formamide, percent |
| Toluene sulphonic anhydride | 89.3 | 96.5 |
| Toluene sulphonic acid | 1.6 | 1.58 |
| Sulphuric acid | 0.03 | 0.03 |
| Ditolyl sulphone | 8.77 | 1.53 |

Example 8

Toluene sulphonic anhydride of composition identical with that obtained in Example 7, experiment B, was redissolved in chloroform at 40° C. and the resultant solution was cooled to 0° C. and filtered to recover crystals of the following composition:

| | Percent |
|---|---|
| Toluene sulphonic anhydride | 98.5 |
| Toluene sulphonic acid | 1.48 |
| Sulphuric acid | 0.01 |
| Ditolyl sulphone | 0.01 |

Example 9

Toluene, containing dimethylformamide, and sulphur trioxide, both in sulphur dioxide solution, were concurrently fed into a spinning disc reactor and the product sampled after only a few seconds residence time.

| | Percent |
|---|---|
| Concentration of sulphur trioxide in sulphur dioxide | 20.4 |
| Concentration of toluene in sulphur dioxide | 27.5 |
| Concentration of dimethylformamide | *3.0 |

(*Based on the theoretical yield of monosulphonic acid if all the toluene was converted to it).

| Moles $SO_3$/mole toluene: | Conversion of toluene to sulphonic anhydride, percent |
|---|---|
| 1.1 | 48.1 |
| 1.3 | 48.8 |
| 1.4 | 51.2 |
| 1.5 | 52.5 |
| 1.6 | 50.0 |
| 1.7 | 44.0 |
| 1.9 | 37.5 |

The theoretical ratio of 1.5 moles $SO_3$ to 1.0 mole toluene was shown to be the optimum.

We claim:

1. A process for the production of an arene sulphonic anhydride which comprises reacting at a temperature in the range of —40° to 20° C. and in a liquid sulphonation solvent, sulphur trioxide with an aromatic compound or a monosulphonated aromatic compound or salt thereof in the presence of 0.5%–4% by weight based on the yield of sulphonated product of a compound capable of forming a complex with sulphur trioxide selected from the group consisting of short alkyl chain carboxylic acids and their anhydrides; primary, secondary and tertiary amines and formamides thereof of from 1 to 18 carbon atoms and their salts, formamide, urea alkylolamines, alkylolamides; ethylenediamine tetraacetic acid and its salts; nitrilotriacetic acid and its salts; inorganic and organic ammonium salts of phosphoric, sulphuric and p-toluene sulphonic acids; aromatic amines; nitrogen-contaning heterocyclics selected from the group consisting of pyridine, quinoline, and isoquinoline, ketones containing up to 6 carbon atoms; ethers containing up to 6 carbon atoms in each alkyl group, including cyclic ethers; esters of short chain carboxylic acids, each esterifying group containing up to 6 carbon atoms; and esters of oxy acids of phosphorus selected from the group consisting of phosphorous acid and phosphoric acid containing up to 6 carbon atoms in each esterifying group, sufficient sulphur trioxide being employed that the total molar ratio of $SO_3$ (whether present as free $SO_3$ or as part of the monosulphonate reactant) to aromatic compound is from 1.4 to 1.9:1.

2. A process according to claim 1 wherein said compound or said salt to be reacted with $SO_3$ is selected from the group consisting of benzene, toluene, xylene, cumene, ethyl benzene, a halogenated benzene, and a monosulphonate derivative of any of these.

3. A process according to claim 2 wherein the reaction is carried out in a liquid sulphur dioxide solvent and wherein the concentration of sulphur trioxide in said solvent is in the range of 10–50% by weight.

4. A process according to claim 3 wherein the molar ratio of total $SO_3$ to aromatic compound is from 1.5 to 1.7:1.

5. A process according to claim 4 wherein prior to admixing the reactants each is dissolved in liquid sulphur dioxide.

6. A process according to claim 9 wherein the concentration of sulphur trioxide in sulphur dioxide is in the range 30–40% by weight.

7. A process according to claim 2 wherein the reaction is carried out at a temperature in the range —20 to 0° C.

8. A process according to claim 7 wherein sulphur dioxide acts as an autorefrigerant.

9. A process according to claim 7 wherein the compound capable of forming a complex with sulphur trioxide is present in an amount of from 2–3% by weight based on the anticipated yield of sulphonated product.

10. A process according to claim 7 wherein the compound capable of forming a complex with sulphur trioxide employed in a short alkyl chain aliphatic carboxylic acid or an anhydride or ester thereof.

11. A process according to claim 9 wherein the complex forming compound is the ester of a short chain carboxylic acid with an alcohol having less than 6 carbon atoms.

12. A process according to claim 7 wherein the complex forming compound is an ester of phosphoric or phosphorous acids with an alcohol having less than 6 carbon atoms.

13. A process according to claim 7 where in the complex forming compound is a primary, secondary or tertiary aliphatic amine or amide having up to 18 carbon atoms.

14. A process according to claim 7 wherein the complex forming compound is an aromatic amine.

15. A process according to claim 7 wherein the complex forming compound is a nitrogen-containing heterocyclic compound.

16. A process according to claim 9 wherein the complex forming compound is selected from the group consisting of formamide, urea, dimethylamine, isopropylamine and dimethyl formamide.

17. A process according to claim 9 wherein the complex forming compound is pyridine.

18. A process according to claim 9 wherein the complex forming agent is acetic acid or an ester thereof.

19. A process according to any of claim 7 wherein the complex forming compound is a ketone having up to 6 carbon atoms or ether having up to 6 carbon atoms in each alkyl group.

20. A process according to claim 7 wherein the sulphonic anhydride is separated from the reaction mixture by quenching in cold water a mixture of ice and water.

21. A process according to claim 1 wherein the reaction is carried out in a liquid sulphur dioxide solvent.

References Cited

UNITED STATES PATENTS 2,483,213  9/1949  Lecher et al. _____ 260—545

OTHER REFERENCES

Houben-Weyl, Methoden der Organischen Chemie, Band IX, pp. 503–4, 1955.

ROBERT GERSH, Primary Examiner

U.S. Cl. X.R.

260—607 A

UNITED STATES PATENT AND TRADEMARK OFFICE
CERTIFICATE OF CORRECTION

PATENT NO. : 3,829,484
DATED : August 13, 1974
INVENTOR(S) : AUSTEN EDGAR SOWERBY et al It is certified that error appears in the above-identified patent and that said Letters Patent are hereby corrected as shown below:

Column 2, line 50, replace "the that" with --that the--.

Column 3, line 41, correct the spelling of "reaction".

Column 3, line 57, correct the spelling of "binary".

Column 3, line 64, correct the spelling of "The".

Column 5, line 15, correct the spelling of "comparative".

Column 8, line 43, replace the "2" with --4--.

Signed and Sealed this

Thirtieth Day of May 1978

[SEAL]

Attest:

RUTH C. MASON
Attesting Officer

LUTRELLE F. PARKER
Acting Commissioner of Patents and Trademarks